(12) United States Patent
Li et al.

(10) Patent No.: US 10,380,332 B2
(45) Date of Patent: Aug. 13, 2019

(54) VOICEPRINT LOGIN METHOD AND APPARATUS BASED ON ARTIFICIAL INTELLIGENCE

(71) Applicant: BAIDU ONLINE NETWORK TECHNOLOGY (BEIJING) CO., LTD., Beijing (CN)

(72) Inventors: Chao Li, Beijing (CN); Yong Guan, Beijing (CN); Lei Jia, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 253 days.

(21) Appl. No.: 15/317,139

(22) PCT Filed: Jul. 15, 2015

(86) PCT No.: PCT/CN2015/084038
§ 371 (c)(1),
(2) Date: Dec. 8, 2016

(87) PCT Pub. No.: WO2016/150032
PCT Pub. Date: Sep. 29, 2016

(65) Prior Publication Data
US 2017/0124311 A1    May 4, 2017

(30) Foreign Application Priority Data

Mar. 20, 2015  (CN) .......................... 2015 1 0125685

(51) Int. Cl.
*G06F 21/32*  (2013.01)
*G06N 20/00*  (2019.01)
(Continued)

(52) U.S. Cl.
CPC .............. *G06F 21/32* (2013.01); *G06F 21/31* (2013.01); *G06N 7/005* (2013.01); *G06N 20/00* (2019.01);
(Continued)

(58) Field of Classification Search
CPC .......... G06F 21/32; G06F 21/31; G06F 21/44; G06F 21/30; G06F 21/10; G06N 99/005;
(Continued)

(56) References Cited

U.S. PATENT DOCUMENTS 8,694,315 B1 * 4/2014 Sheets .............. G06Q 20/40145
                                                      704/246
9,258,302 B2 * 2/2016 Fu ......................... H04L 63/083
(Continued)

FOREIGN PATENT DOCUMENTS

CN      102413100 A     4/2012
CN      104036780 A     9/2014
(Continued)

OTHER PUBLICATIONS

Li, Qiu-hua, et al., The Network Account Identity Authentication System based on Voiceprint Recognition and Speech Recognition, Netinfo Security, Dec. 2013, pp. 37-41.
(Continued)

*Primary Examiner* — Khang Do
*Assistant Examiner* — Khalid M Almaghayreh
(74) *Attorney, Agent, or Firm* — Hodgson Russ LLP

(57) ABSTRACT

Disclosed is a voiceprint login method based on artificial intelligence. The method includes: S1: receiving a login request from a user and acquiring user information of the user; S2: generating a login string and replacing at least one character of the login string according to character replacement reference information corresponding to the user information; S3: providing the login string after replacement to
(Continued)

the user and receiving speech information of the user reading the login string; and S4: performing a login authentication on the user according to speech information of the user reading the login string. With the method, by using the voiceprint authentication method combining the voiceprint and the character replacement reference information set by the user, the safety of the voiceprint password is increased, and some characters are hidden according the user's preferences, which satisfies the user's psychological demand of not wishing the password to be displayed explicitly.

20 Claims, 3 Drawing Sheets

(51) Int. Cl.
　　 H04L 29/06　　(2006.01)
　　 G06N 7/00　　(2006.01)
　　 G10L 15/26　　(2006.01)
　　 G10L 17/02　　(2013.01)
　　 G10L 17/04　　(2013.01)
　　 G10L 17/24　　(2013.01)
　　 G06F 21/31　　(2013.01)

(52) U.S. Cl.
　　 CPC ............ G10L 15/265 (2013.01); G10L 17/02 (2013.01); G10L 17/04 (2013.01); G10L 17/24 (2013.01); H04L 29/06 (2013.01)

(58) Field of Classification Search
　　 CPC ....... G10L 15/265; G10L 17/02; G10L 17/24; H04L 29/04; H04L 29/06823; H04L 29/06836; H04L 63/10; H04L 9/3268; H04L 9/32
　　 USPC ........ 709/225; 713/155, 170, 186, 165, 182; 726/31, 17, 19, 2, 4
　　 See application file for complete search history.

(56) References Cited

U.S. PATENT DOCUMENTS

| | | | | |
|---|---|---|---|---|
| 9,336,779 | B1* | 5/2016 | Patel ....................... | G06F 21/36 |
| 2003/0037004 | A1* | 2/2003 | Buffum ................... | G06F 21/32 |
| | | | | 705/51 |
| 2005/0180547 | A1* | 8/2005 | Pascovici ................ | G10L 17/04 |
| | | | | 379/88.01 |
| 2007/0219801 | A1* | 9/2007 | Sundaram ............... | G10L 17/04 |
| | | | | 704/270 |
| 2008/0172725 | A1* | 7/2008 | Fujii ....................... | G06F 21/32 |
| | | | | 726/5 |
| 2008/0256613 | A1* | 10/2008 | Grover ................... | G06F 21/32 |
| | | | | 726/5 |
| 2010/0325706 | A1* | 12/2010 | Hachey ................. | H04L 9/3271 |
| | | | | 726/6 |
| 2012/0253809 | A1* | 10/2012 | Thomas .................. | G10L 17/24 |
| | | | | 704/246 |
| 2013/0132091 | A1 | 5/2013 | Skerpac | |
| 2013/0225128 | A1 | 8/2013 | Gomar | |
| 2013/0290565 | A1* | 10/2013 | Kamakura .............. | G06F 21/70 |
| | | | | 709/245 |
| 2014/0046664 | A1* | 2/2014 | Sarkar ................... | H04W 12/06 |
| | | | | 704/246 |
| 2014/0129974 | A1* | 5/2014 | Ben-Harrush ........ | G06F 3/0484 |
| | | | | 715/781 |
| 2014/0237576 | A1 | 8/2014 | Zhang et al. | |
| 2015/0178490 | A1* | 6/2015 | Tamboly ................. | G06F 21/36 |
| | | | | 726/4 |
| 2015/0193776 | A1* | 7/2015 | Douglas ................. | G06Q 20/02 |
| | | | | 705/16 |
| 2015/0249664 | A1* | 9/2015 | Talhami .................. | G06F 21/32 |
| | | | | 726/6 |
| 2016/0034686 | A1* | 2/2016 | Yin ......................... | G06F 21/46 |
| | | | | 726/6 |
| 2017/0126690 | A1* | 5/2017 | Ogawa .................... | G06F 21/31 |

FOREIGN PATENT DOCUMENTS

| | | |
|---|---|---|
| CN | 104168270 A | 11/2014 |
| CN | 104270338 A | 1/2015 |
| JP | H0237456 | 2/1990 |
| JP | H0816189 | 1/1996 |
| JP | 2002311992 A * | 10/2002 |
| JP | 2008160745 | 7/2008 |
| JP | 2009123157 | 6/2009 |
| JP | 5670001 B1 | 2/2015 |

OTHER PUBLICATIONS

ISA/CN, International Search Report for PCT/CN2015/084038.
Chang et al., Text-independent Speaker Verification using a Hybrid I-Vector/DNN Approach, Proceedings of the Twenty-Fifth Conference on Computational Linguistics and Speech Processing, Dec. 2013, pp. 141-142, vol. 19.
JPO, Office Action for JP Application No. 2017506899, dated Apr. 26, 2018.
European Patent Office, Extended European Search Report for 15885968.6 dated Dec. 19, 2017.

* cited by examiner

VOICEPRINT LOGIN METHOD AND APPARATUS BASED ON ARTIFICIAL INTELLIGENCE

CROSS REFERENCE TO RELATED APPLICATION

This application is a U.S. national phase of International Application No. PCT/CN2015/084038, which claims priority to Chinese Patent Application No. "201510125685.7", filed by Baidu Online Network Technology (Beijing) Co., Ltd. on Mar. 20, 2015 and entitled "VOICEPRINT LOGIN METHOD AND APPARATUS BASED ON ARTIFICIAL INTELLIGENCE".

FIELD

Embodiments of the present disclosure generally relate to a login authentication technology field, and more particularly, to a voiceprint login method and apparatus based on artificial intelligence.

BACKGROUND

Currently, for login systems of websites (or devices), identity authentication is generally performed by inputting an account and a password (or a gesture) by the user. After the authentication is successful, the login is performed. However, the login method based on the password or the gesture input has following problems: once the password or the gesture is known by another person, the other person can also complete the login, and thus there exists safety risk; moreover, in order to increase safety, the user generally sets different passwords with special characters for different objects, thus obviously bringing great memory burden to the user.

In addition, there have appeared methods in which voiceprint is used as the password for login authentication. However, the conventional voiceprint password is easily affected by factors such as environment noise and channel difference, and thus the reliability is not good, and especially in the field such as finance and the field related to secret, there exists safety problems.

SUMMARY

Embodiments of the present disclosure provide a voiceprint login method based on artificial intelligence, including: S1, receiving a login request of a user, and obtaining user information of the user; S2, generating a login string, and replacing at least one character of the login string according to character replacement reference information corresponding to the user information; S3, providing the login string after replacement to the user, and receiving speech information of the user reading the login string; and S4, performing a login authentication on the user according to the speech information of the user reading the login string.

Embodiments of the present disclosure provide a voiceprint login apparatus based on artificial intelligence, including: an obtaining module, configured to receive a login request of a user, and to obtain user information of the user; a replacing module, configured to generate a login string, and to replace at least one character of the login string according to character replacement reference information corresponding to the user information; a first providing module, configured to provide the login string after replacement to the user; a first receiving module, configured to receive speech information of the user reading the login string; and an authentication module, configured to perform a login authentication on the user according to the speech information of the user reading the login string.

Embodiments of the present disclosure further provide a non-transitory computer storage medium, in which the computer storage medium includes one or more modules, and the one or more modules are caused to perform: receiving a login request of a user, and obtaining user information of the user; generating a login string, and replacing at least one character of the login string according to character replacement reference information corresponding to the user information; providing the login string after replacement to the user, and receiving speech information of the user reading the login string; and performing a login authentication on the user according to the speech information of the user reading the login string.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figures 1, 2A, 2B, 2C:
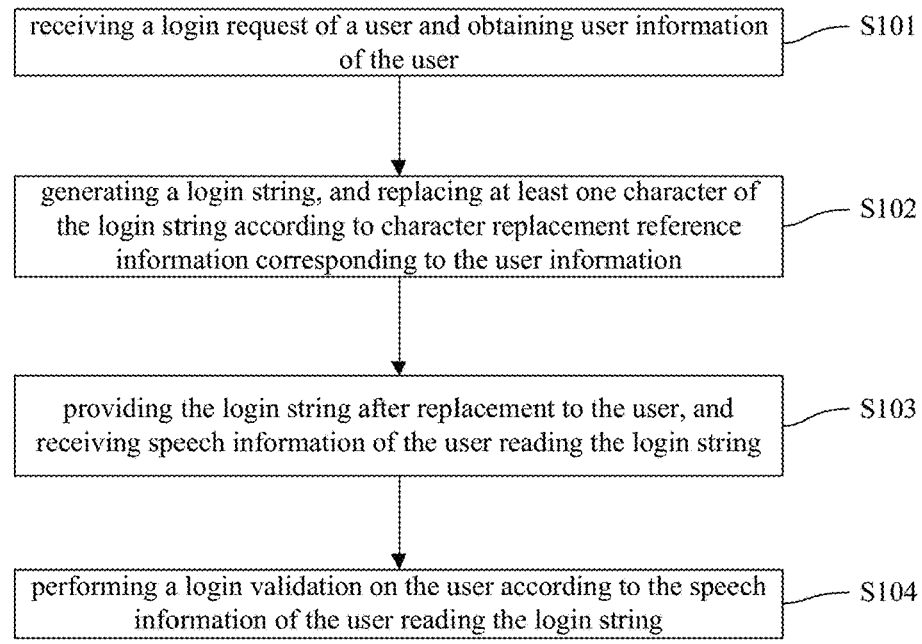
FIG. 1 is a flow chart of a voiceprint login method based on artificial intelligence according to an embodiment of the present disclosure.
FIG. 2(a) is a schematic diagram of an edit interface provided for a user according to an embodiment of the present disclosure.
FIG. 2(b) is a schematic diagram of a registration string provided for a user after replacement according to an embodiment of the present disclosure.
FIG. 2(c) is a schematic diagram of a login string provided for a user after replacement according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

A voiceprint login method and apparatus based on artificial intelligence according to embodiments of the present disclosure will be described in the following with reference to drawings.

Embodiments of the present disclosure provide a voiceprint login method based on artificial intelligence, including:

S1, receiving a login request of a user, and obtaining user information of the user; S2, generating a login string, and replacing at least one character of the login string according to character replacement reference information corresponding to the user information; S3, providing the login string after replacement to the user, and receiving speech information of the user reading the login string; and S4, performing a login authentication on the user according to the speech information of the user reading the login string.

FIG. 1 is a flow chart of a voiceprint login method based on artificial intelligence according to an embodiment of the present disclosure. As shown in FIG. 1, the voiceprint login method based on artificial intelligence may include following steps.

At step S101, a login request of a user is received, and user information of the user is obtained.

For example, assume that the voiceprint login method based on artificial intelligence according to embodiments of the present disclosure is applied in the login system of the website. When the user opens the website to login, the user may send the login request to the login system via the client, and the login system obtains the user information of the user after obtaining the login request sent by the user via the client. In embodiments of the present disclosure, the user information may include but be not limited to account/user name and user ID.

Further, in an embodiment of the present disclosure, before the user logins, the user may first registers. In other words, before receiving the login request of the user and obtaining the user information of the user (step S101), the voiceprint login method based on artificial intelligence may further include: receiving a registration request of the user, and providing a registration string to the user; receiving speech information of the user reading the registration string, and extracting a voiceprint of the user. In embodiments of the present disclosure, the registration string may be a numerical string generated randomly. In addition, in order to cover a larger sample space, any number in the registration string only occurs once.

Specifically, assume that the voiceprint login method based on artificial intelligence according to embodiments of the present disclosure is applied in the login system of the website. When the user opens the website to register, the user may send the registration request to the login system via the client, and the login system may generate a registration string randomly after receiving the registration request sent by the user and provide the registration string to the user. Then, the speech information generated by the user through reading the provided registration string can be received, and the speech recognition is performed on the speech information to generate corresponding text information, and then the text information is matched with the registration string text pre-stored in the system. If the matching is not successful, a matching error is returned to the user and the user is reminded of reading the registration string again. If the matching is successful, it is determined that the user registration is successful. Moreover, an extraction may be performed on the speech information of the user reading the registration string by using the identity-vector (i-vector) modeling method so as to obtain the voiceprint of the user, and a correspondence between the user information of the user and the voiceprint is established and stored. Thus, the user may complete the registration via speech, thus simplifying the operation steps of the user.

In embodiments of the present disclosure, the i-vector modeling method may include following steps: performing an extraction on the speech information of the user reading the registration string; performing a Baum-Welch statistic on acoustic features of multiple speech segments in the speech information of the user reading the registration string in the condition of universal background model (UBM), and extracting multiple i-vectors of the multiple speech segments; obtaining a registration i-vector of the user according to the multiple i-vectors of the multiple speech segments. Specifically, the i-vector modeling method may include two stages of signal processing and modeling. The signal processing includes signal pre-enhancement, voice activity detection (VDA), acoustic feature extraction, and feature processing, etc. At the modeling stage, the Baum-Welch statistic is performed on the acoustic feature (for example, MFCC) of each speech segment in the condition of UBM, to calculate the posterior probability, which follows the Gaussian distribution, and the expectation of the posterior probability is the i-vector.

For example, one speech segment u is divided into L-frame acoustic feature $\{y_1, y_2, \ldots, y_L\}$, a feature dimension of which is D. The 0-order Baum-Welch statistic and the 1-order Baum-Welch statistic are calculated on the UBM model $\Omega$ including C Gaussian, which is as follows:

$$N_c = \sum_{t=1}^{L} P(c \mid y_t, \Omega) \quad (1)$$

$$F_c = \sum_{t=1}^{L} P(c \mid y_t, \Omega)(y_t - m_c) \quad (2)$$

where, $c=1, 2, \ldots, C$ is an index of the Gaussian model, $P(c|y_t,\Omega)$ is the posterior probability of $y_t$ on the $c^{th}$ Gaussian, $m_c$ is the expectation of the $c^{th}$ Gaussian. By using the following formula (3), the i-vector of the speech u is obtained:

$$\eta = (I + T^t \Sigma^{-1} NT)^{-1} T^t \Sigma^{-1} F \quad (3)$$

where, N is a CD×CD-dimension square matrix, the diagonal elements of which are $N_c I$ ($c=1, \ldots, C$), F is a CD×1 vector consisting of all 1-order statistics $F_c$, T and $\Sigma$ are a transfer matrix and a variance matrix of the i-vector extractor respectively, which are obtained by factorization during training and can be directly obtained herein, operator $(\ )^t$ represents the matrix transposition, and I is an unit matrix.

Assume that the speech information of the user reading the registration string during the registration has K sentences, and from each of which, one independent i-vector is extracted. When it is detected the user has read the whole numerical string, these K i-vectors are combined to calculate a unique i-vector of the user, which is used to represent the voiceprint characteristic of the user, and is calculated as follows:

$$\tilde{\eta} = \text{norm}\left(\frac{1}{K} \sum_{k=1}^{K} \text{norm}(\eta_k)\right) \quad (4)$$

where, operator norm( ) indicates the length normalization, i.e., changing the modulus of the vector in ( ) to 1. Moreover, the voiceprint presentation form of $$\tilde{\eta}' = \frac{1}{K} \sum_{k=1}^{K} \text{norm}(\eta_k)$$

is also supported.

Thus, the extraction is performed on the speech information of the user reading the registration string by using the above i-vector modeling method, to obtain the voiceprint of the user.

Further, in an embodiment of the present disclosure, the user may set replacement characters according to demands and preferences during the user registration. Specifically, the voiceprint login method based on artificial intelligence may further include: providing an edit interface, and providing in the edit interface replacement symbols for replacing characters in the string; and receiving characters to be replaced and corresponding replacement symbols selected by the user to generate the character replacement reference information. In embodiments of the present disclosure, the replacement symbol may be but not limited to the character (for example, !@#$%^&*( )), picture (for example, water, fire and wind) and Chinese character (for example, "水", "火", and "风"). Thus, by combing special symbols such as characters, pictures and Chinese characters, the password may be friendlier, and the usability of the password is increased.

More specifically, during the user registration, an edit interface may be provided to the user before the registration string is provided to the user, and replacement symbols for replacing characters in the string may be provided in the edit interface, in which the replacement symbols may be special characters in the keyboard, Chinese characters or pictures, and the user may select the character to be replaced and the corresponding replacement symbol according to his needs and preferences. After receiving the characters to be replaced and the corresponding replacement symbols selected by the user, the character replacement reference information may be generated according to the user's selection. For example, the user may replace character 2 with symbol ? and replace character 8 with symbol & according to his preferences. For another example, the user may replace character 1 with symbol # and replace character 6 with symbol @ according to his preferences. Thus, the character replacement reference information may be generated according to the user settings, i.e., the character 2 is replaced with symbol ?, character 8 is replaced with symbol &, character 1 is replaced with symbol #, and character 6 is replaced with symbol @.

It should be noted that, in an embodiment of the present disclosure, the registration string may include the character to be replaced which are selected by the user. Thus, after the character replacement reference information is generated, when the registration string is generated randomly, the characters (for example, characters 1 and 6) to be replaced which are selected by the user in the registration string (for example, 32149658) may be replaced according to the character replacement reference information, i.e., the registration string 32149658 is replaced with 32#49@58, and the registration string 32#49@58 after replacement is provided to the user, and when the user reads the registration string, he may read the replacement symbols # and @ in the registration string as the corresponding characters 1 and 6 according to the replacement symbols set by himself, i.e., the user reads the registration string 32#49@58 as 32149658.

At step S102, a login string is generated, and at least one character in the login string is replaced according to the character replacement reference information corresponding to the user information. In embodiments of the present disclosure, the login string may be a numerical string. Thus, the recording deception may be avoided, and the login safety is increased.

Specifically, after the login request of the user is received and the user information of the user is obtained, a login string may be generated randomly for the user, and the character replacement reference information set by the user previously may be found according to the user information, and the characters in the login string generated randomly may be replaced according to the character replacement reference information, in which the characters to be replaced and the characters after replacements are all from the character replacement reference information set by the user previously. For example, the character replacement reference information of the user includes replacing character 1 with symbol # and replacing character 6 with symbol @, and the login string generated randomly is 91765, then the login string can be replaced as 9#7@5 according to the character replacement reference information. It can be understood that, in embodiments of the present disclosure, numbers in the login string generated randomly may be different from each other, and numbers in the registration string generated randomly may be different from each other. In addition, in order to make the numerical string read by the user during the login authentication as close to the voiceprint characteristic registered by the user as possible, each number in the login string only occurs once, and the login string has the numbers to be replaced which are selected by the user.

At step S103, the login string after replacement is provided to the user, and speech information of the user reading the login string is received.

Specifically, the login string after replacement may be provided to the user, and the user may read the login string following the tips. After it is detected that the reading completes, the speech information of the user reading the login string is received.

At step S104, a login authentication is performed on the user according to the speech information of the user reading the login string.

Specifically, in an embodiment of the present disclosure, a speech recognition may be performed on the speech information of the user reading the login string to obtain text information corresponding to the speech information; the text information is matched with the login string; if the text information is consistent with the login string, a voiceprint matching is further performed on the speech information of the user reading the login string; and if the voiceprint matching is successful, it is determined that the user passes the login authentication.

More specifically, after the speech information of the user reading the login string is received, the speech recognition is performed on the speech information to obtain the corresponding text information, and then the text information is matched with the login string generated in advance. If the matching is not successful, an error is returned to the user and the user is reminded of reading the login string again, and only if the matching is successful, the voiceprint matching is further performed according to the speech information. If the voiceprint in the speech information is matched with the pre-stored voiceprint of the user, it may be determined that the user passes the login authentication, otherwise the authentication is regarded as failure.

Since the login string is a series of numbers, the user generally reads the whole string in one breath when reading the string, i.e., there is only one speech segment in the speech information generated. Taking the speech information having one speech segment as an example, in an embodiment of the present disclosure, the voiceprint matching process for the speech information of the user reading the login string is realized as follows: performing an extraction on the speech information of the user reading the login string; performing a Baum-Welch statistic on acoustic features of speech in the speech information of the user reading the login string in the condition of universal background model, and extracting an identity-vector of the speech as a login identity-vector of the user; and comparing the login identity-vector with the registration identity-vector for determining whether the voiceprints are matched. Specifically, the voiceprint matching process may include three stages of signal processing, voiceprint comparing and consistence determining. The signal processing in the voiceprint matching process is totally same as the signal processing in the registration process, and will not be elaborated herein. At the voiceprint matching stage, the i-vector generated at the login process and the i-vector generated at the registration process are compared and scored, in which methods such as cosine distance, support vector machine (SVM), Bayes classifier, and Gaussian Probability and Linear Discriminant Analysis (GPLDA) may be used. In the following, the GPLDA method is used to describe the voiceprint matching process.

Assume that the i-vector from the authentication process is $\eta_1$ and the i-vector of the voiceprint registered by the user on the server is $\eta_2$, then there are two assumptions: $H_1$, both of them belong to a same speaker; $H_d$, they belong to different speakers. Thus, the log-likelihood ratio score of this hypothesis testing is obtained as:

$$\text{score} = \log \frac{P(\eta_1, \eta_2 \mid H_1)}{P(\eta_1 \mid H_d) P(\eta_2 \mid H_d)}, \quad (5)$$

where, assume that both the conditional probability distribution at the numerator and the conditional probability distribution at the denominator follow the Gaussian distribution, and the expectations thereof are 0. Thus, the above the log-likelihood ratio score can be simplified as:

$$\text{score} = \log N\left(\begin{bmatrix}\eta_1\\\eta_2\end{bmatrix}; \begin{bmatrix}0\\0\end{bmatrix}\begin{bmatrix}\Sigma_{tot} & \Sigma_{ac}\\\Sigma_{ac} & \Sigma_{tot}\end{bmatrix}\right) - \log N\left(\begin{bmatrix}\eta_1\\\eta_2\end{bmatrix}; \begin{bmatrix}0\\0\end{bmatrix}\begin{bmatrix}\Sigma_{tot} & 0\\0 & \Sigma_{tot}\end{bmatrix}\right) \quad (6)$$

$$= \eta_1^t Q \eta_1 + \eta_2^t Q \eta_2 + 2\eta_1^t P \eta_2 + const$$

where, Q, P, $\Sigma_{tot}$ and $\Sigma_{ac}$ are represented respectively as:

$Q = \Sigma_{tot}^{-1} - (\Sigma_{tot} - \Sigma_{ac} \Sigma_{tot}^{-1} \Sigma_{ac})^{-1}$ $P = \Sigma_{tot}^{-1} \Sigma_{ac} (\Sigma_{tot} - \Sigma_{ac} \Sigma_{tot}^{-1} \Sigma_{ac})^{-1}$ $\Sigma_{tot} = \Phi\Phi^t + \Sigma$ $\Sigma_{ac} = \Phi\Phi^t \quad (7)$ where, $\Phi$ and $\Sigma$ are from the training stage of the GPLDA model, and can be obtained directly herein. The GPLDA model is represented as:

$$\eta_r = m + \Phi\beta + \varepsilon_r \quad (8),$$

where, $\eta_r$ represents the i-vector of the $r^{th}$ person observed, $\beta$ is the true value of the voiceprint of the speaker, is a hidden variable and cannot be obtained directly, $\Phi$ is a transfer matrix, $\varepsilon_r$ is an observation error and follows the Gaussian distribution of $N(0,\Sigma)$.

In addition, a score fusion of multiple classifiers may be supported during the voiceprint authentication according to embodiments of the present disclosure. In other words, multiple classification algorithms may be used in the authentication process, for example, three classifiers such as SVM, GPLDA and cosine distance are used, and then the scores of these three classifiers are fused to obtain a final score.

Moreover, a multi-feature fusion may also be supported in the voiceprint authentication process according to embodiments of the present disclosure. In other words, multiple acoustic features may be extracted, and then same or different classifiers are used to score, and then the scores are fused together. For example, both MFCC and PLP features are extracted for one speech, and then i-vectors are obtained respectively based on MFCC and PLP and then input into the GPLDA classifier to obtain 2 scores, and finally the 2 scores are fused to one score.

Finally, at the consistence determining stage in the voiceprint matching process, the above score obtained may be determined with a predetermined threshold, if the score is greater than the threshold, it is determined as the same speaker (i.e., the same user), i.e., it is determined that the user login is successful, otherwise it is determined as different speakers, i.e., it is determined that the user login fails.

It should be noted that, in embodiments of the present disclosure, the registration string and the login string are generated randomly, such that the location of the replaced character in the registration string and the login string provided to the user after replacement is randomly distributed. When the user reads the registration string and the login string, he reads the replacement character in the registration string and the login string as the character set by him. Thus, some characters are hidden according to the user's needs and preferences, which satisfies the user's psychological demand of not wishing the password to be displayed explicitly, thus improving the user experience.

In order to make those skilled in the art clearly understand the present disclosure, below examples will be given.

For example, when the registration request of the user is received, the edit interface may be first provided to the user, and in this edit interface, replacement symbols for replacing characters in the string are provided. As shown in FIG. 2(a), the edit interface may have two attributes of "characters" and "displayed as", and the user may set which characters need to be replaced with the replacement symbols in the edit interface, for example, replacing character 2 with symbol ? and replacing character 8 with symbol &. After the user completes the setting, the character replacement reference information is generated according to the settings of the user. Then, the registration string (for example, 67925843) is generated randomly, and characters in the registration string are replaced according to the character replacement reference information, and the registration string after replacement is provided to the user, such as the registration string 679?5&43 provided to the user after replacement, as shown in FIG. 2(b). The user only needs to replace the replacement symbols in the string with the pronunciation of the characters set by him when reading, i.e., makes a pronunciation corresponding to 67925843 when reading. Moreover, the voiceprint of the user may be extracted according to the speech of the user, for use in the later login authentication. When the login request of the user is received, a login string is generated randomly, for example, 915238. Then, the login string 915238 is replaced according to the character replacement reference information corresponding to the user information, and the login string after replacement is provided to the user, such as the login string 915?3& provided to the user after replacement, as shown in FIG. 2(c). Similarly, the user only needs to replace the replacement symbols in the string with the pronunciation of the characters set by him when reading, i.e., makes a pronunciation corresponding to 915238 when reading. If the speech information of the user reading the login string is detected to be correct, the voiceprint authentication is further performed according to the speech, and if the voiceprint matching is successful, it is determined that the user login is successful.

With the voiceprint login method based on artificial intelligence according to embodiments of the present disclosure, the login request of the user may be received first and the user information of the user may be obtained, and then the login string may be generated, at least one character of the login string may be replaced according to the character replacement reference information corresponding to the user information, the login string after replacement is provided to the user, the speech information of the user reading the login string is received, and the login authentication is performed on the user according to the speech information of the user reading the login string. The method has at least following advantages: (1) by using the voiceprint authentication method combining the voiceprint and the character replacement reference information set by the user, an additive effect of the safety of the voiceprint and the safety of the conventional password can be achieved, and the safety of the voiceprint password is increased; (2) some characters are hidden according the user's preferences, thus satisfying the user's psychological demand of not wishing the password to be displayed explicitly, and moreover, the user only needs to set some replacement characters without the need of remembering a long password, thus improving the user experience and increasing the safety of the password.

In order to achieve above embodiments, the present disclosure also provides a voiceprint login apparatus based on artificial intelligence. The apparatus includes: an obtaining module, configured to receive a login request of a user, and to obtain user information of the user; a replacing module, configured to generate a login string, and to replace at least one character of the login string according to character replacement reference information corresponding to the user information; a first providing module, configured to provide the login string after replacement to the user; a first receiving module, configured to receive speech information of the user reading the login string; and an authentication module, configured to perform a login authentication on the user according to the speech information of the user reading the login string.

Figure 3:
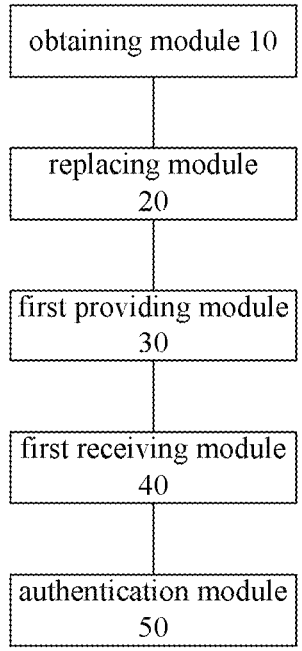
FIG. 3 is a block diagram of a voiceprint login apparatus based on artificial intelligence according to an embodiment of the present disclosure.

FIG. 3 is a block diagram of a voiceprint login apparatus based on artificial intelligence according to an embodiment of the present disclosure. As shown in FIG. 3, the voiceprint login apparatus based on artificial intelligence may include an obtaining module 10, a replacing module 20, a first providing module 30, a first receiving module 40 and an authentication module 50.

Specifically, the obtaining module 10 may be configured to receive a login request of a user, and to obtain user information of the user. For example, assume that the voiceprint login apparatus based on artificial intelligence according to embodiments of the present disclosure is applied in the login system of the website. When the user opens the website to login, the user may send the login request to the login system via the client, and the obtaining module 10 obtains the user information of the user after obtaining the login request sent by the user via the client. In embodiments of the present disclosure, the user information may include but be not limited to account/user name and user ID.

The replacing module 20 may be configured to generate a login string and to replace at least one character of the login string according to character replacement reference information corresponding to the user information. In embodiments of the present disclosure, the login string may be a numerical string generated randomly. Thus, the recording fraud may be avoided and the safety of the login may be increased. More specifically, after the obtaining module 10 receives the login request of the user and receives the user information of the user, the replacing module 20 may generate a login string randomly for the user, find the character replacement reference information according to the user information, and replace characters in the login string generated randomly according to the character replacement reference information, in which all of the characters replaced and the characters after replacement come from the character replacement reference information. For example, the character replacement reference information of the user include replacing character 1 with symbol # and replacing character 6 with symbol @, the login string generated randomly is 91765, then the login string may be replaced as 9#7 @5 according to the character replacement reference information. In order to make the numerical string read by the user during the login authentication as closer to the voiceprint feature registered by the user as possible, each number in the login string can only occur once, and the login string should have the replaced numbers selected by the user.

The first providing module 30 may be configured to provide the login string after replacement to the user. The first receiving module 40 may be configured to receive speech information of the user reading the login string. More specifically, the first providing module 30 may provide the login string after replacement to the user, and the user may read the login string following the tips. After the first receiving module 40 detects that the reading completes, it can receive the speech information of the user reading the login string.

The authentication module 50 may be configured to perform a login authentication on the user according to the speech information of the user reading the login string. Specifically, in embodiments of the present disclosure, the process performed by the authentication module 50 for performing the login authentication on the user according to the speech information of the user reading the login string may be as follows: performing a speech recognition on the speech information of the user reading the login string to obtain text information corresponding to the speech information; matching the text information with the login string; if the text information is consistent with the login string, further performing a voiceprint matching on the speech information of the user reading the login string; and if the voiceprint matching is successful, determining that the user passes the login authentication.

More specifically, after the authentication module 50 receives the speech information of the user reading the login string, the speech recognition is performed on the speech information to obtain the corresponding text information, and then the text information is matched with the login string generated in advance. If the matching is not successful, an error is returned to the user and the user is reminded of reading the login string again, and only if the matching is successful, the voiceprint matching is further performed according to the speech information. If the voiceprint in the speech information is matched with the pre-stored voiceprint of the user, it may be determined that the user passes the login authentication, otherwise the authentication is regarded as failure.

Since the login string is a series of numbers, the user generally reads the whole string in one breath when reading the string, i.e., there is only one speech segment in the speech information generated. Taking the speech information having one speech segment as an example, in an embodiment of the present disclosure, the authentication module 50 realizes voiceprint matching process for the speech information of the user reading the login string as follows: performing an extraction on the speech information of the user reading the login string; performing a Baum-Welch statistic on acoustic features of speech in the speech information of the user reading the login string in the condition of universal background model, and extracting an identity-vector of the speech as a login identity-vector of the user; and comparing the login identity-vector with the registration identity-vector for determining whether the voiceprints are matched. With respect to the special process, reference may be made to the description in the voiceprint login method based on artificial intelligence according to embodiments of the present disclosure, which is not elaborated herein.

Figure 4:
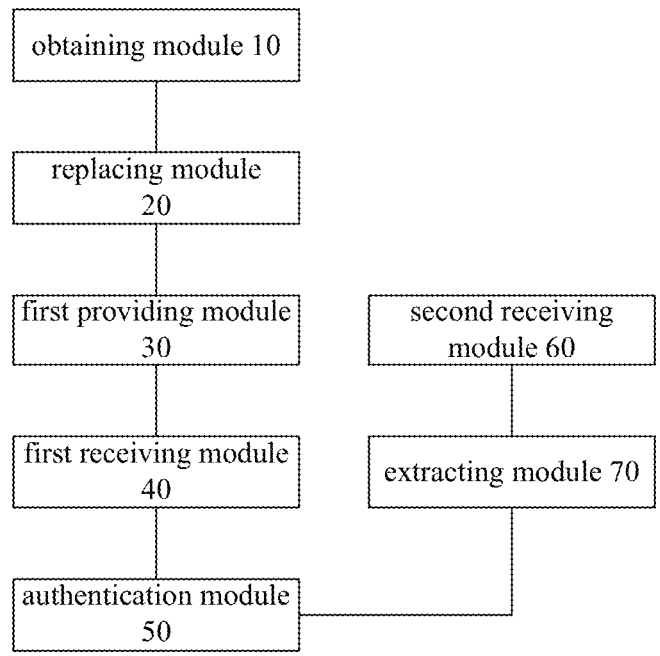
FIG. 4 is a block diagram of a voiceprint login apparatus based on artificial intelligence according to another embodiment of the present disclosure.

Further, in an embodiment of the present disclosure, and as shown in FIG. 4, the voiceprint login apparatus based on artificial intelligence may further include a second receiving module 60 and an extracting module 70. Specifically, the second receiving module 60 may be configured to receive a registration request of the user and provide a registration string to the user before the obtaining module 10 receives the login request of the user and obtains the user information of the user. The extracting module 70 may be configured to receive speech information of the user reading the registration string and to extract a voiceprint of the user. In embodiments of the present disclosure, the registration string may be a numerical string generated randomly. In addition, in order to cover a greater sample space, any number in the registration string only occurs once. It can be understood that, in embodiments of the present disclosure, numbers in the login string generated randomly may be different from each other, and numbers in the registration string may also be different from each other.

More specifically, assume that the voiceprint login apparatus based on artificial intelligence according to embodiments of the present disclosure is applied in the login system of the website. When the user opens the website to register, the user may send a registration request to the login system via the client, and a registration string may be generated randomly after the second receiving module 60 receives the registration request of the user, and the registration string is provided to the user. Then, the extracting module 70 receives the speech information generated by the user through reading the provided registration string, and performs the speech recognition on the speech information to generate corresponding text information, and then matches the text information with the registration string text pre-stored in the system. If the matching is not successful, a matching error is returned to the user and the user is reminded of reading the registration string again. If the matching is successful, it is determined that the user registration is successful. Moreover, the extracting module 70 may perform the extraction on the speech information of the user reading the registration string by using the identity-vector (i-vector) modeling method so as to obtain the voiceprint of the user, and establish and store a correspondence between the user information of the user and the voiceprint. Thus, the user may complete the registration via speech, thus simplifying the operation steps of the user.

In embodiments of the present disclosure, the i-vector modeling method may include following steps: performing an extraction on the speech information of the user reading the registration string; performing a Baum-Welch statistic on acoustic features of multiple speech segments in the speech information of the user reading the registration string in the condition of universal background model (UBM), and extracting multiple i-vectors of the multiple speech segments; obtaining a registration i-vector of the user according to the multiple i-vectors of the multiple speech segments. With respect to the process, reference may be made to the description in the voiceprint login method based on artificial intelligence according to embodiments of the present disclosure, which is not elaborated herein.

Figure 5:
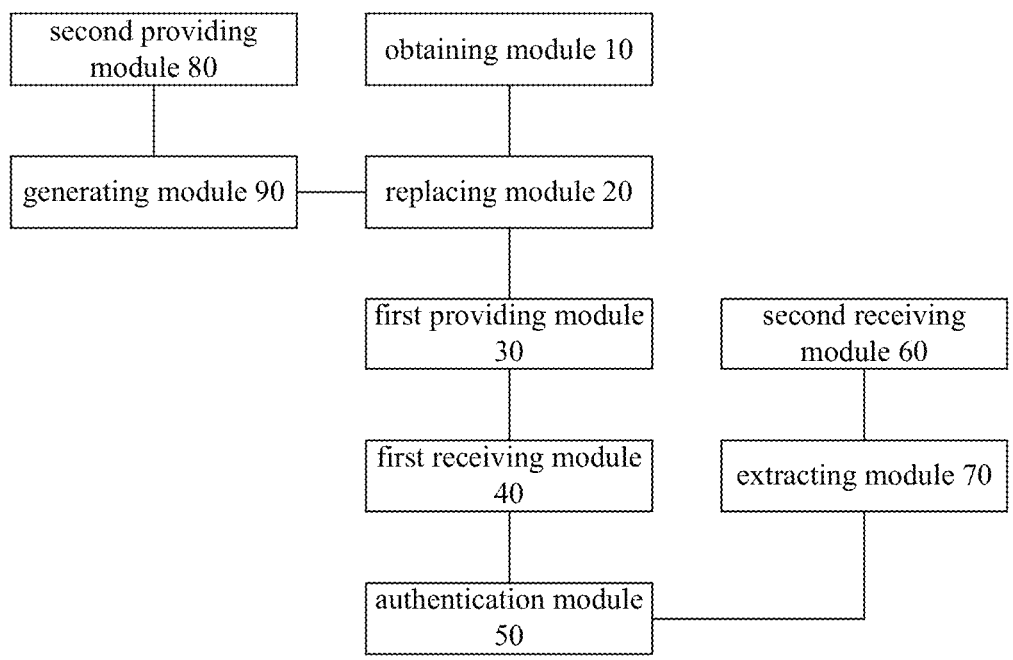
FIG. 5 is a block diagram of a voiceprint login apparatus based on artificial intelligence according to yet another embodiment of the present disclosure.

Further, in an embodiment of the present disclosure, and as shown in FIG. 5, the voiceprint login apparatus based on artificial intelligence may further include a second providing module 80 and a generating module 90. Specifically, the second providing module 80 may be configured to provide an edit interface and to provide in the edit interface replacement symbols for replacing characters in the string. The generating module 90 may be configured to receive characters and corresponding replacement symbols selected by the user, so as to generate the character replacement reference information. In embodiments of the present disclosure, the replacement symbol may be but not limited to the character (for example, !@#$%^&*( )), picture (for example, water, fire and wind) and Chinese character (for example, "水", "火", and "风"). Thus, by combing special symbols such as characters, pictures and Chinese characters, the password may be friendlier, and the usability of the password is increased.

More specifically, during the user registration, before the second receiving module 60 provides the registration string to the user, the second providing module 80 may provide an edit interface to the user and provide replacement symbols for replacing characters in the string in the edit interface, in which the replacement symbols may be special characters in the keyboard, Chinese characters or pictures, and the user may select the character to be replaced and the corresponding replacement symbol according to his needs and preferences. After the generating module 90 receives the characters to be replaced and the corresponding replacement symbols selected by the user, it may generate the character replacement reference information according to the user's selection. For example, the user may replace character 2 with symbol ? and replace character 8 with symbol & according to his preferences. For another example, the user may replace character 1 with symbol # and replace character 6 with symbol @ according to his preferences. Thus, the character replacement reference information may be generated according to the user settings, i.e., the character 2 is replaced with symbol ?, character 8 is replaced with symbol &, character 1 is replaced with symbol #, and character 6 is replaced with symbol @.

It should be noted that, in an embodiment of the present disclosure, the registration string may include the character to be replaced which are selected by the user. Thus, after the generating module 90 generates the character replacement reference information, and when the second receiving module 60 generates the registration string randomly, the characters (for example, characters 1 and 6) to be replaced which are selected by the user in the registration string (for example, 32149658) may be replaced according to the character replacement reference information, i.e., the registration string 32149658 is replaced with 32#49@58, and the registration string 32#49 @58 after replacement is provided to the user, and when the user reads the registration string, he may read the replacement symbols # and @ in the registration string as the corresponding characters 1 and 6 according to the replacement symbols set by himself, i.e., the user reads the registration string 32#49@58 as 32149658.

It should be noted that, in embodiments of the present disclosure, the registration string and the login string are generated randomly, such that the location of the replaced character in the registration string and the login string provided to the user after replacement is randomly distributed. When the user reads the registration string and the login string, he reads the replacement character in the registration string and the login string as the character set by him. Thus, some characters are hidden according to the user's needs and preferences, which satisfies the user's psychological demand of not wishing the password to be displayed explicitly, thus improving the user experience.

With the voiceprint login apparatus based on artificial intelligence according to embodiments of the present disclosure, the obtaining module may receive the login request of the user and obtain the user information of the user, the replacing module may generate the login string, and replace at least one character of the login string according to the character replacement reference information corresponding to the user information, the first providing module provides the login string after replacement to the user, the first receiving module receives speech information of the user reading the login string, and the authentication module performs the login authentication on the user according to the speech information of the user reading the login string, which at least has following advantages: (1) by using the voiceprint authentication method combining the voiceprint and the character replacement reference information set by the user, an additive effect of the safety of the voiceprint and the safety of the conventional password can be achieved, and the safety of the voiceprint password is increased; (2) some characters are hidden according the user's preferences, thus satisfying the user's psychological demand of not wishing the password to be displayed explicitly, and moreover, the user only needs to set some replacement characters without the need of remembering a long password, thus improving the user experience and increasing the safety of the password.

It should be noted that, in the description of the present disclosure, terms such as "first" and "second" are used herein for purposes of description and are not intended to indicate or imply relative importance or significance or imply the number of technical features. Furthermore, the feature defined by "first" or "second" may indicate or imply including at least one feature. In the description of the present disclosure, "at least one" refers to one or more and "a plurality of" refers to two or more unless otherwise specified.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the functions may be executed in other orders instead of the order illustrated or discussed, including in a basically simultaneous manner or in a reverse order, which should be understood by those skilled in the art.

Any process or method described in a flow chart or described herein in other ways may be understood to be a sequence table of executable instructions for achieving logical functions, which may be realized in any computer-readable medium for being used by the instruction execution system, device or apparatus (for example, the system based on the computer, the system including the processor or other systems capable of reading instructions from the instruction execution system, device or apparatus and executing the instructions) or being used in combination with the instruction execution system, device or apparatus. In the specification, "computer-readable medium" may be any device including, storing, communicating, broadcasting or transmitting programs for being used by the instruction execution system, device or apparatus or being used in combination with the instruction execution system, device or apparatus. Specific examples of the computer-readable medium (non-exhaustiveness list) include: electrical connection (electronic device) having one or one wires, portable computer disk box (magnetic device), random access memory (RAM), read only memory (ROM), electrically programmable read-only-memory (EPROM or flash memory), fiber device, and portable CD-ROM. In addition, the computer-readable medium may even to paper on which programs can be printed or other appropriate medium, this is because optical scanning may be performed on the paper or the other medium, and then edit, interpretation or any other appropriate way if necessary are performed to electrically obtain the programs, and then the programs are stored in the computer storage.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A computer-implemented voiceprint login method based on artificial intelligence, comprising:
  receiving, at one or more computing devices, a login request of a user, and obtaining, at the one or more computing devices, user information of the user;
  generating, at the one or more computing devices, a login string, and replacing, at the one or more computing devices, at least one character of the login string according to character replacement reference information corresponding to the user information;
  providing, at the one or more computing devices, the login string after replacement to the user, and receiving, at the one or more computing devices, speech information of the user reading the login string; and
  performing, at the one or more computing devices, a login authentication on the user according to the speech information of the user reading the login string.

2. The method according to claim 1, wherein performing, at the one or more computing devices, a login authentication on the user according to the speech information of the user reading the login string comprises:
  performing, at the one or more computing devices, a speech recognition on the speech information of the user reading the login string to obtain text information corresponding to the speech information;
  matching, at the one or more computing devices, the text information with the login string;
  if the text information is consistent with the login string, further performing, at the one or more computing devices, a voiceprint matching on the speech information of the user reading the login string; and
  if the voiceprint matching is successful, determining, at the one or more computing devices, that the user passes the login authentication.

3. The method according to claim 1, before receiving, at one or more computing devices, a login request of a user and obtaining, at the one or more computing devices, user information of the user, further comprising:
  receiving, at the one or more computing devices, a registration request of the user, and providing, at the one or more computing devices, a registration string to the user; and
  receiving, at the one or more computing devices, speech information of the user reading the registration string, and extracting, at the one or more computing devices, a voiceprint of the user.

4. The method according to claim 3, further comprising:
  providing, at the one or more computing devices, an edit interface, and providing, at the one or more computing devices, in the edit interface replacement symbols for replacing characters in the string; and
  receiving, at the one or more computing devices, characters to be replaced and corresponding replacement symbols selected by the user, to generate the character replacement reference information.

5. The method according to claim 4, wherein the replacement symbols comprise characters, pictures and Chinese characters.

6. The method according to claim 3, wherein the login string and the registration string are numerical strings generated randomly, in which numbers in the login string are different from each other, and numbers in the registration string are different from each other.

7. The method according to claim 6, wherein the registration string comprises characters to be replaced which are selected by the user, and the login string comprises characters to be replaced which are selected by the user.

8. The method according to claim 3, wherein the voiceprint of the user is extracted by an identity-vector modeling method.

9. The method according to claim 8, wherein the identity-vector modeling method comprises:
  performing, at the one or more computing devices, an extraction on the speech information of the user reading the registration string;
  performing, at the one or more computing devices, a Baum-Welch statistic on acoustic features of multiple speech segments in the speech information of the user reading the registration string in the condition of universal background model, and extracting, at the one or more computing devices, multiple identity-vectors of the multiple speech segments;
  obtaining, at the one or more computing devices, a registration identity-vector of the user according to the multiple identity-vectors of the multiple speech segments.

10. The method according to claim 9, wherein performing, at the one or more computing devices, a voiceprint matching on the speech information of the user reading the login string comprises:
  performing, at the one or more computing devices, an extraction on the speech information of the user reading the login string;
  performing, at the one or more computing devices, a Baum-Welch statistic on acoustic features of speech in the speech information of the user reading the login string in the condition of universal background model, and extracting, at the one or more computing devices, an identity-vector of the speech as a login identity-vector of the user; and
  comparing, at the one or more computing devices, the login identity-vector with the registration identity-vector for determining whether the voiceprints are matched.

11. A voiceprint login apparatus based on artificial intelligence, comprising:
  a processor; and
  a memory for storing instructions executable by the processor, wherein the processor is configured to:
    receive a login request of a user, and obtain user information of the user;
    generate a login string, and replace at least one character of the login string according to character replacement reference information corresponding to the user information;
    provide the login string after replacement to the user, and receive speech information of the user reading the login string; and perform a login authentication on the user according to the speech information of the user reading the login string.

12. The apparatus according to claim 11, wherein the processor is configured to perform a login authentication on the user according to the speech information of the user reading the login string by acts of:
performing a speech recognition on the speech information of the user reading the login string to obtain text information corresponding to the speech information;
matching the text information with the login string;
if the text information is consistent with the login string, further performing a voiceprint matching on the speech information of the user reading the login string; and
if the voiceprint matching is successful, determining that the user passes the login authentication.

13. The apparatus according to claim 11, before receiving a login request of a user and obtaining user information of the user, wherein the processor is further configured to:
receive a registration request of the user, and provide a registration string to the user; and
receive speech information of the user reading the registration string, and extract a voiceprint of the user.

14. The apparatus according to claim 13, wherein the processor is further configured to:
provide an edit interface, and provide in the edit interface replacement symbols for replacing characters in the string; and
receive characters to be replaced and corresponding replacement symbols selected by the user, to generate the character replacement reference information.

15. The apparatus according to claim 13, wherein the login string and the registration string are numerical strings generated randomly, in which numbers in the login string are different from each other, and numbers in the registration string are different from each other.

16. The apparatus according to claim 15, wherein the registration string comprises characters to be replaced which are selected by the user, and the login string comprises characters to be replaced which are selected by the user.

17. The apparatus according to claim 13, wherein the voiceprint of the user is extracted by an identity-vector modeling method.

18. The apparatus according to claim 17, wherein the identity-vector modeling method comprises:
performing an extraction on the speech information of the user reading the registration string;
performing a Baum-Welch statistic on acoustic features of multiple speech segments in the speech information of the user reading the registration string in the condition of universal background model, and extracting multiple identity-vectors of the multiple speech segments;
obtaining a registration identity-vector of the user according to the multiple identity-vectors of the multiple speech segments.

19. The apparatus according to claim 18, wherein the processor is configured to perform a voiceprint matching on the speech information of the user reading the login string by acts of:
performing an extraction on the speech information of the user reading the login string;
performing a Baum-Welch statistic on acoustic features of speech in the speech information of the user reading the login string in the condition of universal background model, and extracting an identity-vector of the speech as a login identity-vector of the user; and
comparing the login identity-vector with the registration identity-vector for determining whether the voiceprints are matched.

20. A non-transitory computer-readable storage medium having stored therein instructions that, when executed by a processor of an intelligent terminal, causes the intelligent terminal to perform a method for loading a theme application, the method comprising:
receiving a login request of a user, and obtaining user information of the user;
generating a login string, and replacing at least one character of the login string according to character replacement reference information corresponding to the user information;
providing the login string after replacement to the user, and receiving speech information of the user reading the login string; and
performing a login authentication on the user according to the speech information of the user reading the login string.

* * * * *